Nov. 14, 1950     C. T. BOWEN     2,529,863
METHOD AND APPARATUS FOR MAKING HARD
THERMOPLASTIC TUBE ASSEMBLIES
Filed Oct. 30, 1948

Inventor
Claude T. Bowen
By Robert W. Furlong
Atty.

Patented Nov. 14, 1950

2,529,863

UNITED STATES PATENT OFFICE 2,529,863

METHOD AND APPARATUS FOR MAKING HARD THERMOPLASTIC TUBE ASSEMBLIES

Claude Thomas Bowen, Kent, Ohio, assignor to The B. F. Goodrich Company, New York, N. Y., a corporation of New York Application October 30, 1948, Serial No. 57,473

9 Claims. (Cl. 18—1)

This invention relates to a method and apparatus for placing an insert in a hard thermoplastic member and pertains more specifically to the assembly of a spray cap or insert in a hard rubber tube.

It is an object of this invention to provide a method of forcibly inserting and securing a metallic insert in a hard thermoplastic tube without cracking the tube.

It is also an object to provide a method of assembling a spray cap in a hard thermoplastic tube.

It is a further object to provide apparatus for carrying out such objects.

Other and further objects will be apparent from the description which follows.

It has been discovered that by providing a steady inserting force upon a cap or plug and at the same time applying heat to the one end only of the hard thermoplastic member by means of a high frequency alternating electrostatic field, it is possible to accomplish these objects without danger of splitting the thermoplastic when it is deformed momentarily.

Heretofore several methods were used to assemble metallic inserts in hard rubber tubes, all of which methods were objectionable for one or more reasons. For instance, an insert and tube could be formed with thread engaging surfaces, or the insert could be vulcanized in the tube. A threaded insert is disadvantageous in that the insert could become disengaged and be lost, and also because such a threaded article is more expensive. To assemble the insert in the tube and then vulcanize the assembly is not always desirable and sometimes not feasible because of the size and shape of the parts to be joined and because of the difficulty of keeping the insert properly centered. In addition a metallic insert is discolored during the vulcanization.

Although vulcanized hard rubber is generally regarded as being a non-thermoplastic material, it has been found that it may be softened slightly when heated to an elevated temperature, and that it may be distorted somewhat while in this condition and still return to approximately its original dimensions.

Heating the hard rubber tube by means of a high frequency field has been found to be the best method. It is not necessary to heat the entire tube and insert when the method of this invention is used, rather only one end of the hard rubber tube is heated and the metallic insert, which is not substantially affected by the high frequency field, is heated only by conduction. Because of this selective heating, time is saved in the production of each unit. Also by applying heat only to the one end of the tube, it is possible to apply an inserting force on the end of the tube without any danger of bending the tube, for the portions of the tube which are not subjected to the high frequency field are not softened, so these portions have adequate strength to withstand the inserting pressure without deformation.

Other heating methods are not satisfactory because they do not have the advantages outlined above. To heat the assembly in a mold and press is expensive and time consuming; resistance heaters waste much of their heat by radiation and convection. Also none of these other sources of heat can be used in such a manner that only a part of the tube is heated uniformly throughout that particular part. A dielectric material such as hard rubber is heated not only at the surfaces but uniformly throughout when subject to a high frequency field; thus the heating time necessary before the insertion of the cap is reduced.

In a specific embodiment of this invention, a metallic cap is placed adjacent to the receiving end of a hard thermoplastic tube and then inserted into the tube by simultaneous application of an inserting force and the heating effects of a high frequency electrostatic field.

The invention will be easily understood by referring to the accompanying drawings in which, Fig. 1 is a view in elevation of the apparatus embodying this invention, a tube and cap being shown before assembly with the annular electrode in section;

Figure 1:
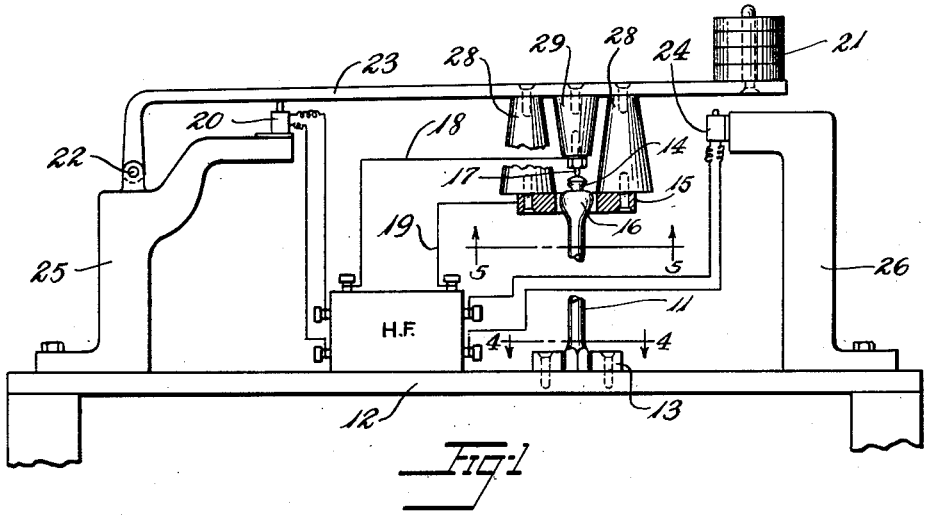

In Fig. 1 the hard rubber tube 11 rests in a vertical position upon a table 12 to which the base jig 13 is secured. The metallic spray cap 14 rests in the mouth of the opening in the hard rubber tube 11. An annular electrode 15 surrounds the receiving end 16 of the hard rubber tube 11, and the top conductive member 17 contacts the metallic spray cap 14. The cap 14 actually acts as the second electrode, in cooperation with annular electrode 15.

A high frequency alternating current is directed to the electrode 15 and cap 14 through conductive member 17 and the leads 18, 19 which connect to a source of power such as a radio frequency generator represented schematically in the drawing by a box labeled HF.

Arm 23 is pivoted at one end on pin 22 which is on pedestal 25 and supports the weight 21 at the opposite end. The annular electrode 15 and the top conductive member 17 are supported by insulating members 28, 28, and 29 from an intermediate point on the arm 23. Switches 20 and 24 are mounted on pedestals 25 and 26 so as to be actuated by the arm 23 as the arm is moved downward to the initial position by the operator and to the final position by the weight 21.

Figures 2, 3:
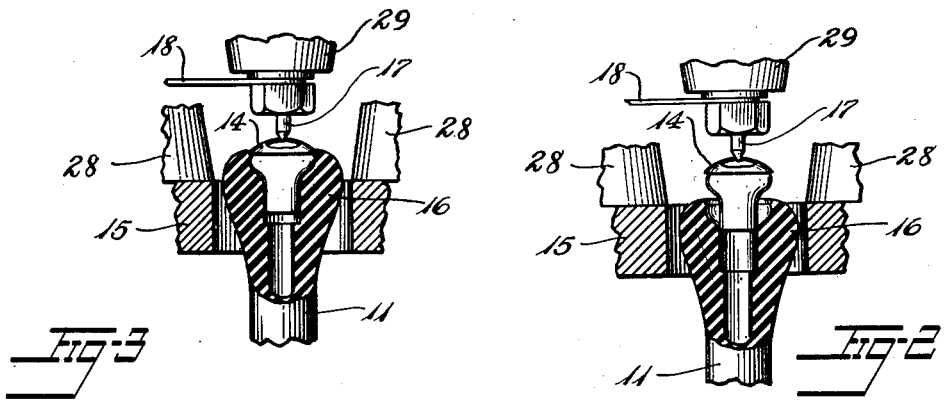
Fig. 2 is a detailed cross-section of the receiving end of the tube with the cap resting thereon.
Fig. 3 is a detailed cross-section of the receiving end of the tube with the cap inserted.
Figures 4, 5:
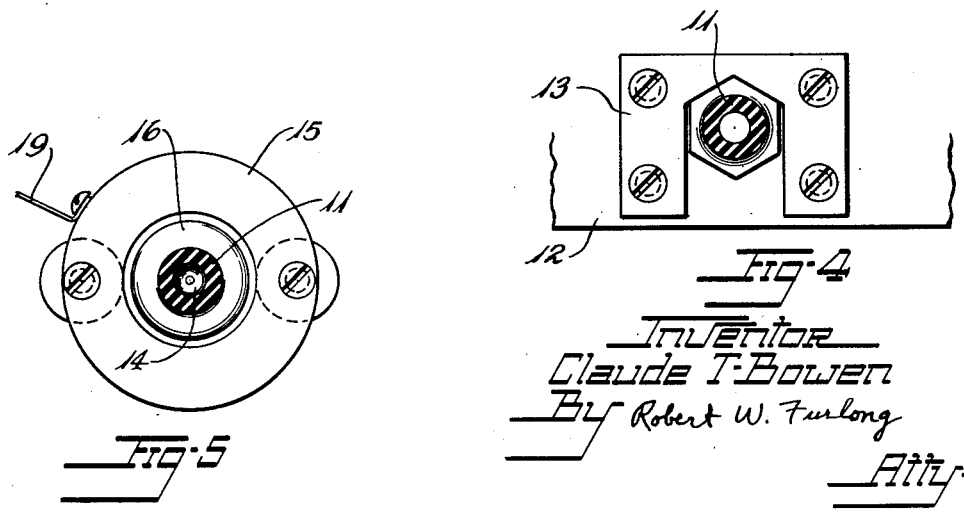
Fig. 4 is a view along line 4—4 of Fig. 1 showing the base jig with the tube in place.
Fig. 5 is a view in line 5—5 of Fig. 1 showing the annular electrode and tube passing through the central opening.

In using the apparatus of this invention, a metallic cap 14 is placed on the receiving end of the tube 11 and the upper end of the tube 16 is then inserted in the annular electrode 15 and the tube 11 placed in a vertical position with the lower end of the tube resting on table 12 in the base jig 13. The arm 23 is then lowered until the top conductive member 17 contacts the metallic cap 14. The arm 23 at the same time closes the switch 20 which completes the power circuit to the high frequency generator. An inserting force is provided by the weight 21 which is mounted on arm 23. As the top of tube 11 is heated in the high frequency field between cap 14 and electrode 15, the cap is forced gradually into the opening in tube 11 as shown in Figs. 2 and 3. When the desired final position has been attained, the electric power is cut off by the action of arm 23 on limit switch 24.

A high frequency electrostatic field is established between the metallic cap 14 and the circular electrode 15 by supplying a high frequency alternating current of from 10 to 80 megacycles frequency or more. When a spray cap is inserted in a douching instrument as in the specific example, a 400 watt power source is adequate. The upper end of hard rubber tube 11 is heated by the high frequency electric field which produces uniform dielectric losses in the rubber.

Although this example describes the operation as being only semi-automatic, it will be understood that many of the hand operations may be carried out by mechanical devices.

The insert and tube may be made of other materials besides metal and hard rubber. The tube may be of any normally hard thermoplastic dielectric material which will soften when heated. The hard thermoplastic material may be rubber, or one of the so-called synthetic or American-made rubbers, or any of the suitable thermoplastic resinous products such as vinylidene resins. The insert may be of any metallic material; spray caps in douche tubes are preferably of a non-ferrous metal or metal alloy such as brass.

The power needed will of course vary with the job to be done. The size of the tube to be heated, the physical properties of the material of the tube, and the length of time for the heating cycle are some of the factors which determine the power to be used. A 400 watt power source is adequate for small jobs such as that of the specific example, but of course the power needs may be greatly increased on some of the other myriad applications of this idea.

Further variations and modifications may be effected within the spirit and scope of the invention as defined in the appended claims.

I claim:

1. The method of joining a pair of members in frictional engagement, one of said members comprising electroconductive material and the other of said members comprising thermoplastic dielectric material, which method comprises providing an electrode, placing at least a portion of said dielectric member between said electrode and said electroconductive member, establishing an alternating high frequency electrostatic field between said electrode and said electroconductive member to heat and soften said dielectric member uniformly throughout that portion subjected to said field, and simultaneously forcing said pair of members into frictional engagement with each other.

2. The method of joining a metallic member in frictional engagement with a member comprising thermoplastic dielectric material, which method comprises providing an electrode opposed to said metallic member, placing at least a portion of said dielectric member between said metallic member and said electrode with said members in close proximity to each other, establishing a high frequency alternating electrostatic field between said metallic member and said electrode to heat and soften said thermoplastic dielectric member uniformly throughout that portion subjected to said field, and forcing said members into frictional engagement with each other while maintaining said electrostatic field in effect.

3. The method of inserting a metallic member into frictional engagement with the walls of an aperture in a member comprising thermoplastic dielectric material, which comprises placing a generally annular electrode around the mouth of said aperture in close proximity to the walls of said dielectric member, establishing a high frequency alternating electrostatic field between said metallic member and said electrode to heat and soften the walls of said dielectric member uniformly throughout their entire thickness, and forcing said metallic member into said aperture while maintaining said electrostatic field in effect.

4. The method of inserting a metallic member into the open end of a tube in frictional engagement with the wall thereof, and tube comprising hard thermoplastic dielectric material, which method comprises placing a generally annular electrode around the end of said tube in close proximity thereto, establishing a high frequency alternating electrostatic field between said metallic member and said electrode, and forcing said metallic member into the end of said tube while maintaining said electrostatic field in effect to heat and soften the end of said tube uniformly throughout the wall thickness thereof.

5. Apparatus for joining an electroconductive member with a thermoplastic dielectric member in frictional engagement which comprises an electrode, means for maintaining said electrode adjacent the portion of said dielectric member to be joined to said electroconductive member, means for establishing a high frequency alternating electrostatic field between said electroconductive member and said electrode, and means for forcing said members into frictional engagement with each other while maintaining said electrostatic field in effect.

6. Apparatus for inserting a metallic member into frictional engagement with the walls of an aperture in a member comprising thermoplastic dielectric material which apparatus comprises a generally annular electrode, means for maintaining said electrode adjacent the walls of said aperture, and means for establishing a high frequency alternating electrostatic field between said metallic member and said electrode including means for forcing said metallic member into frictional engagement with the walls of said aperture.

7. Apparatus for inserting a metallic member into frictional engagement with the walls of an aperture in a member comprising thermoplastic dielectric material which apparatus comprises a generally annular electrode, means for maintaining said electrode adjacent the walls of said aperture, means for establishing a high frequency alternating electrostatic field between said metallic member and said electrode, means for forcing said metallic member into frictional engagement with the walls of said aperture, and means responsive to the relative movement of said members to interrupt said electrostatic field when said members have reached a predetermined position.

8. Apparatus for inserting a metallic member into frictional engagement with the walls of an aperture in a member comprising thermoplastic dielectric material, which apparatus comprises a generally annular electrode, means for maintaining said electrode adjacent the walls of said aperture, and means for forcing said metallic member into frictional engagement with the walls of said aperture including means responsive to the relative movement of said members for establishing and interrupting a high frequency alternating electrostatic field between said metallic member and said electrode when said members have reached predetermined positions.

9. Apparatus for inserting a metallic member into the open end of a tube of thermoplastic dielectric material in frictional engagement with the wall thereof, which apparatus comprises an annular electrode, means for maintaining said electrode adjacent the outer periphery of said open end of said tube, means for establishing a high-frequency alternating electrostatic field between said metallic member and said electrode, means for forcing said metallic member partially into said open end of said tube, and means responsive to the relative movement of said members to interrupt said electrostatic field when said members have reached a predetermined position.

CLAUDE THOMAS BOWEN.

REFERENCES CITED

The following references are of record in the file of this patent:

UNITED STATES PATENTS

| Number | Name | Date |
|---|---|---|
| 1,200,992 | Searles | Oct. 10, 1916 |
| 1,825,427 | Siddall | Sept. 29, 1931 |
| 2,280,771 | Dufour et al. | Apr. 28, 1942 |
| 2,333,143 | Bennett | Nov. 2, 1943 |
| 2,381,083 | Shufflebotham | Aug. 7, 1945 |
| 2,467,213 | Luaces | Apr. 12, 1949 |